Dec. 1, 1925.

R. W. McNEILL

MOTOR CONTROL SYSTEM

Filed May 26, 1923

1,564,007

WITNESSES:

INVENTOR
Ralph W. McNeill.
BY
ATTORNEY

Patented Dec. 1, 1925.

1,564,007

UNITED STATES PATENT OFFICE.

RALPH W. McNEILL, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed May 26, 1923. Serial No. 641,539.

*To all whom it may concern:*

Be it known that I, RALPH W. McNEILL, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to systems that are employed in connection with excavator-hoists and similar machines.

The object of my invention is to provide a system of increased flexibility that is particularly adapted to the requirements of hoisting apparatus.

In accordance with my invention, a hoisting motor is energized by a variable-voltage, differentially-compounded generator, whereby the motor speed is controlled in accordance with the value of the voltage impressed upon the armature and upon the motor shunt field-magnet winding. The motor field winding is also supplied from an external source of energy. A motor of the shunt type, when connected in accordance with my invention, performs, in certain respects, in a manner similar to a series-wound motor.

My invention will be best understood by reference to the accompanying drawing, in which—

Figure 1:
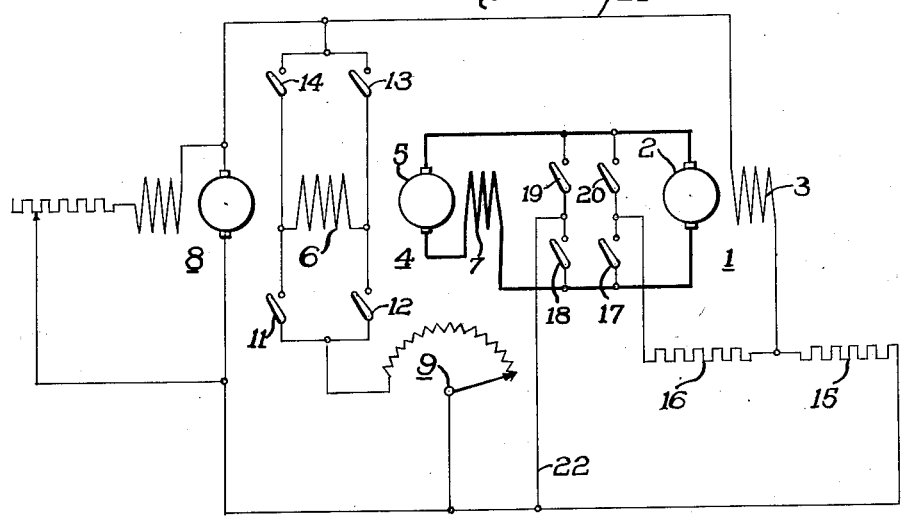
Figure 2:
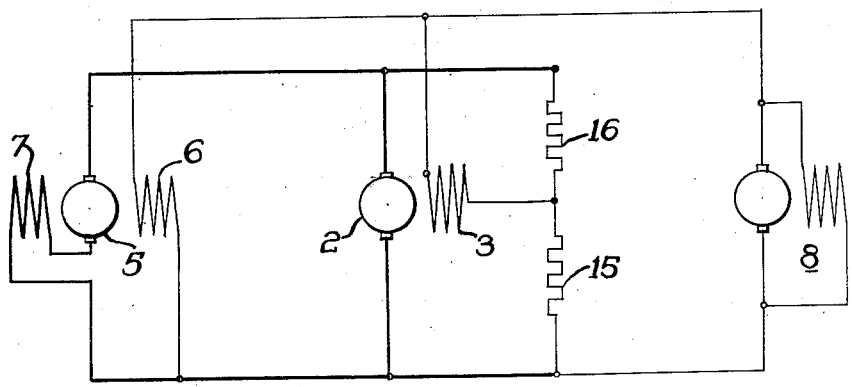

Figure 1 is a diagrammatic view of circuits and apparatus embodying my invention, and Fig. 2 represents, diagrammatically, certain of the main-circuit connections that are employed in Fig. 1.

A shunt-type motor 1, having an armature 2 and a field-magnet winding 3, is operatively connected to a differentially-compounded generator 4, having an armature 5, which is connected in a loop circuit with motor armature 2, and is rotated by a suitable prime-mover (not shown) in a familiar manner. The generator 4 is also provided with a separately-excited field-magnet winding 6 and a series field-magnet winding 7, which is differentially disposed with respect to the field winding 6. A separate source of field excitation is shown as comprising an exciter 8, to which the generator field winding 6 is connected through a field rheostat 9 and reversing switches 11, 12, 13, and 14. The motor field winding 3 is connected to the exciter 8 through a resistor 15. This winding is also interconnected with the armature 5 of generator 4, through a resistor 16 and reversing switches 17, 18, 19 and 20, as hereinafter described in detail.

Assuming the apparatus to be in its illustrated inoperative condition, energy is supplied to motor 1, upon the closure of generator field-reversing switches 11 and 13, in a familiar manner, exciting current being supplied to the generator field winding 6 from the exciter 8 and being limited in accordance with the position of field rheostat 9. Simultaneously with the energization of the generator 4, switches 18 and 20 are closed to complete a circuit for motor field winding 3 from the exciter supply conductor 21 through field winding 3, resistor 16 and the switch 20 to generator armature 5. A circuit from conductor 21 through field winding 3 also extends through resistor 15, conductor 22, switch 18 and series field winding 7 to generator armature 5.

For a minimum generator field excitation, derived as set forth above, a maximum field excitation is provided for the motor on account of the fact that the circuit through the motor field winding 3 divides into parallel branches respectively extending through resistor 15 and through resistor 16, switch 20, armature 2, switch 18 and conductor 22. Armature 2 is of negligible resistance compared to the resistance of resistors 15 and 16 which, when connected in parallel relation, insure a maximum field excitation that is initially derived wholly from exciter 8.

When voltage is gradually applied to the motor armature 2 from the generator armature 5 by operating the rheostat 9 in the counter-clockwise direction, the motor 1 is accelerated in a well-known manner. However, the motor field excitation does not remain constant, but varies in accordance with the increasing voltage of the generator. This effect will be apparent upon reference to Fig. 2, which clearly illustrates the manner in which the motor field winding 3 is interconnected with, and subject to, the voltage of the exciter 8 and also of the generator 4.

Resistors 15 and 16 are together subjected to the voltage of generator armature 5, in consequence of which there is a gradual increase in the drop in potential across these resistors as the field excitation of the generator is increased. It may be assumed that the maximum voltage of the generator is equal to the exciter voltage, in which case the maximum potential across resistors 15 and 16 is equal to the potential across resistor 15 and field winding 3. The resulting decrease in excitation of the winding 3, as the generator voltage increases, corresponds to the increased IR drop in resistor 15 that is the result of the additional voltage impressed thereupon by the armature 5 over the initial exciter voltage. As a consequence, the IR drop in resistor 16 is a minimum, and equal to the voltage across the field winding 3, at the instant when the generator and exciter voltages become equal.

It will be apparent from the foregoing description that the motor 1 is initially provided with maximum field strength at its lowest speed and is thereafter accelerated, by suitable manipulation of the generator field rheostat 9, to a speed corresponding to the position of said rheostat.

Upon increase in the load imposed upon the motor 1, there is a corresponding reduction in the field excitation of generator 4 on account of the well-known effect of the differential series field winding 7. There is also, under such increased load conditions, an increase in field strength of the motor 1 following the decrease in generator voltage, as will be evident from the previous description of the effects of resistors 15 and 16. This increase is entirely independent of the manipulation of any control devices and, if the load increases a sufficient amount to completely de-magnetize the generator field-structure, the motor will "stall" and prevent injury to the hoisting apparatus. The motor will thus exert a gradually increasing torque until its speed is reduced to a minimum, and this result is accomplished without any attention or exercise of special skill on the part of the operator.

A motor of the type herein employed has the well-known and desirable characteristic that, when operated by an over-hauling load, on account of the occurrence of regeneration, the motor speed does not exceed a safe value. In this regard, a motor of the shunt type is preferable to a series motor.

When it is desired to operate the motor 1 in a reverse direction, the operation is similar to that previously described, except that field-reversing switches 12 and 14 are closed, instead of switches 11 and 13. It is necessary also to re-connect resistor 16, since the polarity of the generator armature 5 will be reversed. This connection is accomplished through the closure of switches 17 and 19 instead of switches 18 and 20.

My invention will undoubtedly lend itself to other applications where it is desirable to employ a motor having certain of the desirable characteristics of a series-wound motor and where it is also of advantage to avoid damage to the apparatus which may result from excessive speeds with overhauling loads. I desire not to be limited to the particular connections described, inasmuch as various modifications will readily occur to one skilled in the art.

I claim as my invention:

1. The combination with a motor and a generator in circuit therewith, of means for varying the field excitation of the generator to vary the motor speed, and static means for varying the field excitation of said motor in accordance with the generator voltage.

2. The combination with a motor and a generator in circuit therewith, of means for varying the field excitation of the generator to vary the motor speed, and static means comprising a resistor subject to the generator voltage for varying the field excitation of said motor in accordance with the generator voltage.

3. The combination with a motor, and a generator in circuit therewith, of separately excited field-magnet windings for the motor and the generator, means comprising a switch and a resistor for interconnecting said motor field winding with the armature of said generator and static means for varying the generator field excitation to control the motor field excitation in accordance with load conditions.

4. The combination with a motor and a generator in circuit therewith having shunt-type field-magnet windings, of an exciter therefor, a differentially disposed series field-magnet winding for said generator, means comprising a resistor for connecting said motor field-winding to said exciter, and a second resistor for connecting the first resistor and said motor field-winding to said generator whereby the energization of said motor is varied in accordance with the motor load current.

5. The combination with a motor and a generator in circuit therewith having shunt-type field-magnet windings, of an exciter therefor, a differentially disposed series field-magnet winding for the generator, means for varying the excitation of said shunt-type generator winding to vary the motor speed, and a resistor, responsive to the voltage supplied by said exciter and said generator, for varying the excitation of said motor in accordance with the load imposed on said motor.

6. The combination with a motor and a generator in circuit therewith, of a resistor connected across the generator armature, and separately excited field magnet windings for the motor and the generator, said motor field winding being connected to an intermediate point on said resistor.

7. The combination with a motor and a generator in circuit therewith, of a resistor connected across the generator armature, and separately excited field magnet windings for the motor and the generator, said motor field winding being subject to the drop in potential across said resistor.

8. The combination with a motor and a generator in circuit therewith, of a resistor connected across the generator armature, and separately excited field magnet windings for the motor and the generator, said motor field winding being subject to the drop in potential across said resistor and to the voltage of said exciter.

In testimony whereof, I have hereunto subscribed my name this 21st day of May, 1923.

RALPH W. McNEILL.